United States Patent
Natanzon

(10) Patent No.: US 8,898,515 B1
(45) Date of Patent: Nov. 25, 2014

(54) SYNCHRONOUS REPLICATION USING MULTIPLE DATA PROTECTION APPLIANCES ACROSS MULTIPLE STORAGE ARRAYS

(75) Inventor: Assaf Natanzon, Tel Aviv (IL)

(73) Assignee: EMC International Company, Hamilton (BM)

(*) Notice: Subject to any disclaimer, the term of this patent is extended or adjusted under 35 U.S.C. 154(b) by 253 days.

(21) Appl. No.: 13/535,825

(22) Filed: Jun. 28, 2012

(51) Int. Cl.
*G06F 11/00* (2006.01)

(52) U.S. Cl.
USPC ............................ 714/6.23; 714/12; 711/162

(58) Field of Classification Search
CPC ............ G06F 11/2082; G06F 11/2071; G06F 11/2069
USPC ................................... 714/6.23, 12; 711/162
See application file for complete search history.

(56) References Cited

U.S. PATENT DOCUMENTS

| | | | |
|---|---|---|---|
| 6,199,074 B1* | 3/2001 | Kern et al. ............................. | 1/1 |
| 6,304,980 B1* | 10/2001 | Beardsley et al. ............ | 714/6.23 |
| 7,627,775 B2* | 12/2009 | Kern et al. .................... | 714/6.12 |
| 7,822,892 B2* | 10/2010 | Boyd et al. ....................... | 710/59 |
| 7,996,718 B1* | 8/2011 | Ou et al. ........................... | 714/23 |
| 8,332,687 B1* | 12/2012 | Natanzon et al. .............. | 714/6.3 |

* cited by examiner

*Primary Examiner* — Philip Guyton
(74) *Attorney, Agent, or Firm* — Daly, Crowley, Mofford & Durkee, LLP

(57) ABSTRACT

In one aspect, a method includes replicating multiple volumes synchronously across storage arrays using data protection agents, determining that a component has failed, trying to recover replication using another component and, if recovery of replication is not possible for a predetermined amount of time, stopping replication for all replicated volumes at a consistent point.

19 Claims, 5 Drawing Sheets

SYNCHRONOUS REPLICATION USING MULTIPLE DATA PROTECTION APPLIANCES ACROSS MULTIPLE STORAGE ARRAYS

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes replicating multiple volumes synchronously across storage arrays using data protection agents, determining that a component has failed, trying to recover replication using another component and, if recovery of replication is not possible for a predetermined amount of time, stopping replication for all replicated volumes at a consistent point.

In another aspect, an article includes a non-transitory machine-readable medium that stores executable instructions. The instructions cause a machine to replicate multiple volumes synchronously across storage arrays using data protection agents, determine that a component has failed, try to recover replication using another component and if recovery of replication is not possible for a predetermined amount of time, stop replication for all replicated volumes at a consistent point.

In a further aspect, an apparatus includes circuitry configured to replicate multiple volumes synchronously across storage arrays using data protection agents, determine that a component has failed, try to recover replication using another component and if recovery of replication is not possible for a predetermined amount of time, stop replication for all replicated volumes at a consistent point.

DETAILED DESCRIPTION

Figure 1:
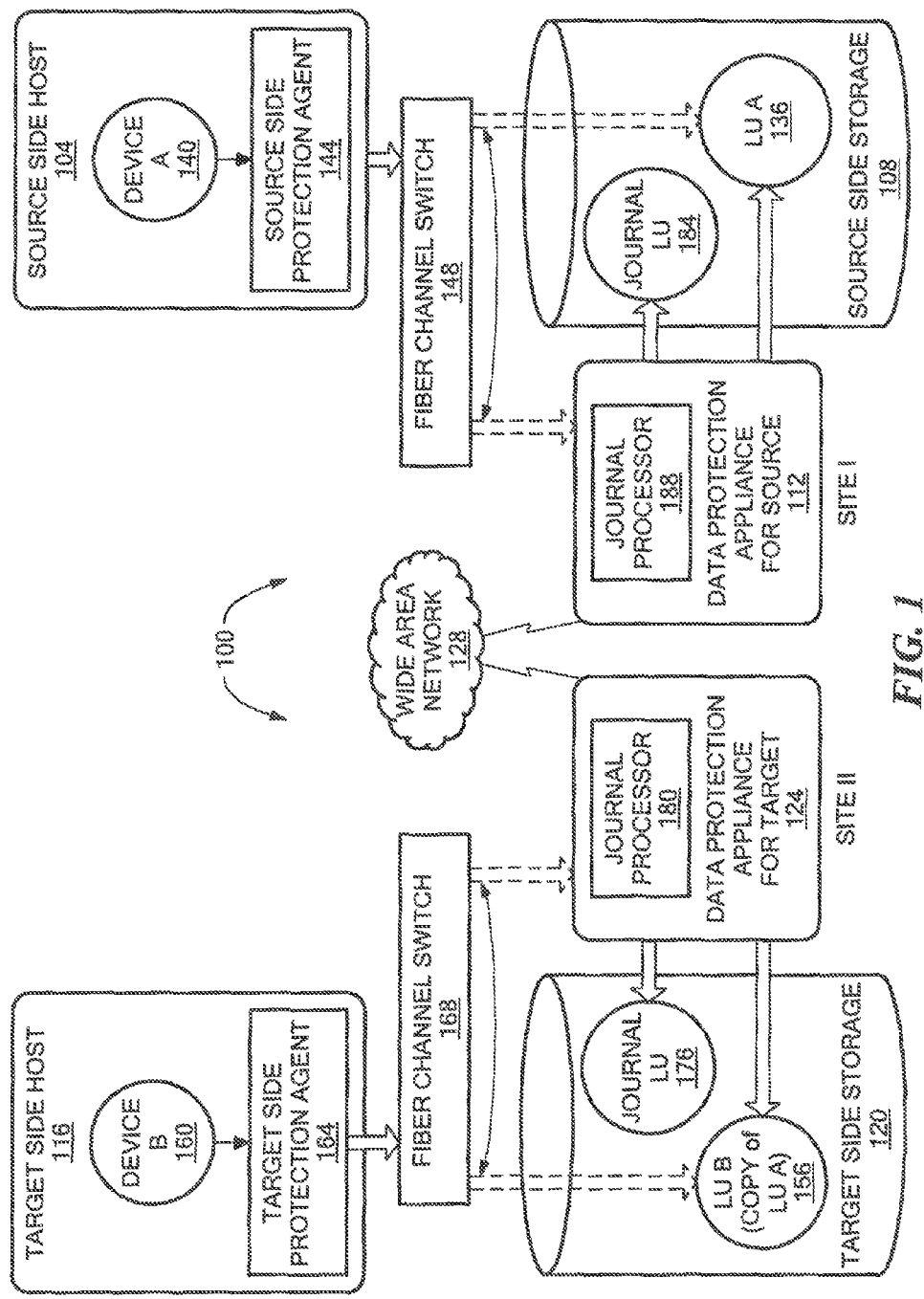
FIG. 1 is a block diagram of an example of a data protection system.

Described herein are techniques to provide synchronous replication of multiple consistency groups running on separate data protection appliances.

By definition synchronous replication will cause applications to stop responding and fail in case of a link failure. Since network connections are significantly less reliable than production storage arrays, for most users, this mode, called a domino mode, may not be acceptable. And thus, most users configure synchronous replication to allow serving I/Os on the production volume in case of a permanent link failure On the other hand, if the link fail is temporary, a user would like the synchronous replication to recover the replication either using a separate link or the same link if the link is recovered. If the system is unable to recover the link for some period of time (usually around 10 seconds), the synchronous replication connection will break, and the application will continue to work on the production site.

Network based replication allows a user to replicate data synchronously even when the source of the data arrives from multiple different storage array (which may fabricated by a different vendor). Usually this is done by sending all the I/Os relevant to one synchronous consistency group to one replication appliance.

Theoretically, in a full domino mode, synchronous replication does not need the concept of consistency groups, since if the link failure causes an application to crash then dependency between the applications I/Os will not be compromised if one application fails due to failure of the link.

However since most users prefer not to use the domino mode, a rolling disaster may cause inconsistencies if the data is replicated not within one consistency group.

The techniques described herein allow synchronous replication to have data consistent at the replication site (target side) even in the case of a rolling disaster which may allow some applications to continue writing before the disaster completes.

The techniques described herein assure that once a replication link is detected as failed, the other consistency groups in a group set (mega consistency group) will also stop receiving and acknowledging I/Os and a bookmark will be created. If the consistency group manages to recover the failed link, the I/O acknowledgments will be answered, if not, all the CGs in the group set will fail at the same time, and move to a non-replicating mode, thereby not compromising the consistency. Thus, the replica image after a rolling disaster will always be consistent.

The following definitions may be useful in understanding the specification and claims.

BACKUP SITE—a facility where replicated production site data is stored; the backup site may be located in a remote site or at the same location as the production site;

CG—consistency group—a set of logical units (LUs) which are replicated together for which write order fidelity is preserved;

DATA PROTECTION APPLIANCE (DPA)—a computer or a cluster of computers responsible for data protection services including inter alia data replication of a storage system, and journaling of I/O requests issued by a host computer to the storage system;

GROUP SET—a set of consistency groups running possibly on separate appliances which allows creation of joint consistency points HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request which may be a read I/O request (read request) or a write I/O request (write request), also referred to as an I/O;

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal);

SPLITTER ACKNOWLEDGEMENT—an acknowledgement from a DPA to the protection agent that data has been received at the DPA; this may be achieved by SCSI status cmd.

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators;

TARGET—a node in a SAN that replies to I/O requests;

TARGET SIDE—a receiver of data within a data replication workflow, during normal operation a back site is the target side, and during data recovery a production site is the target side;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated herein by reference.

An Example of a Replication System

Referring to FIG. 1, a data protection system 100 includes two sites; Site I, which is a production site, and Site II, which is a backup site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1A, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
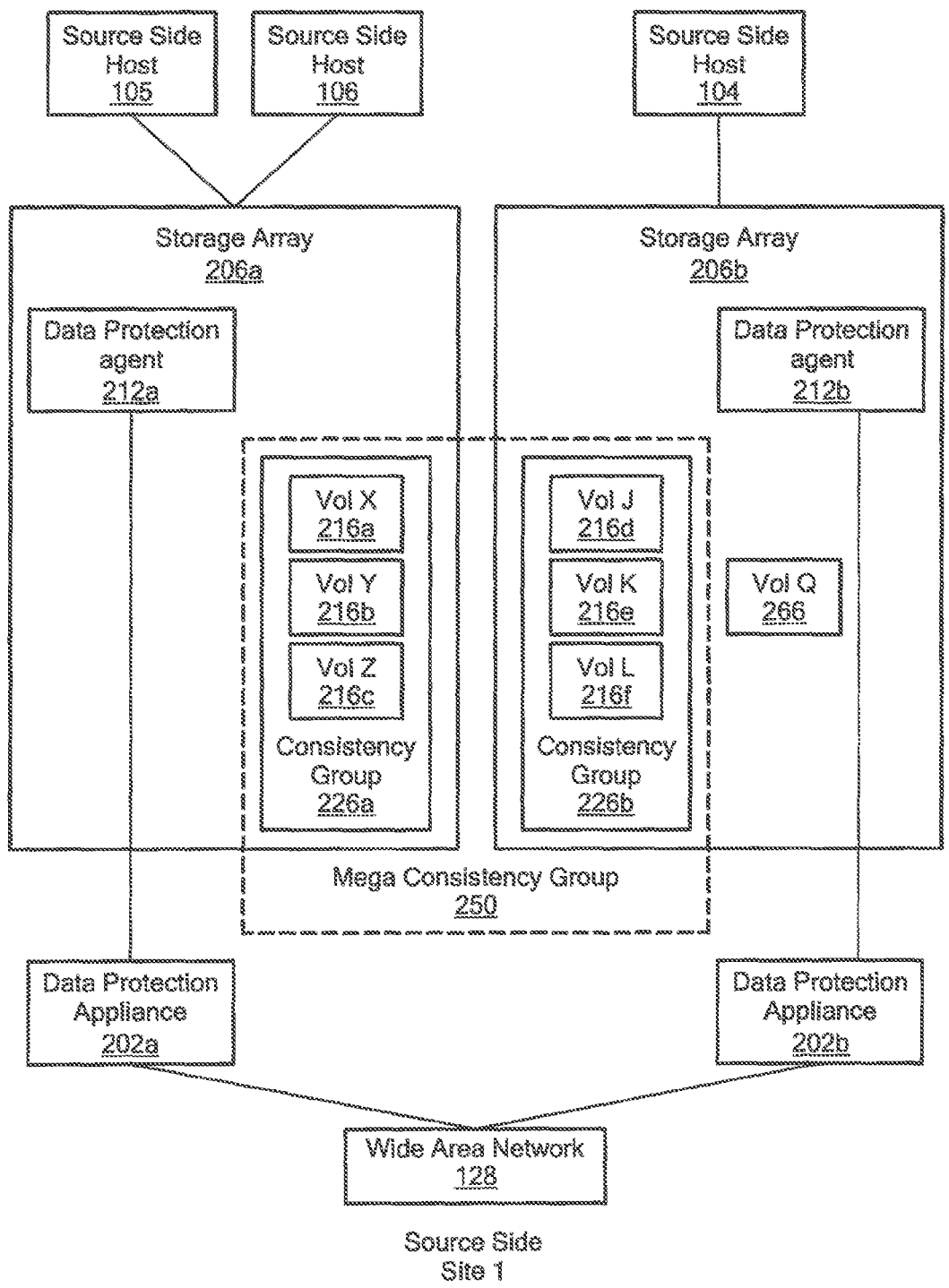
FIG. 2 is a block diagram of another example of components on a source side of a data protection system.

Referring to FIG. 2, the system 100 may be used with multiple DPAs, each DPA assigned to replicate one or more consistency groups (CG). Each CG has at least one volume from a storage array. Further, instead of having one data protection agent (splitter) located at a host, each of the storage arrays has its own data protection agent (splitter)

In particular, on the source side (site I) source side hosts 104, 105, 106 are coupled to the storage arrays 206a, 206b. In particular, the hosts 105, 106 are coupled to storage array 206a and the host 104 is coupled to the storage array 206b. Each storage array 206a, 206b includes a respective data protection agent (e.g., a data protection agent 212a and a data protection agent 212b).

Each data protection agent communicates to all the data protection appliance in the cluster. In this example, one of ordinary skill in the art can observe that each storage array may replicate to a different data protection appliance and still achieve consistency.

Each data protection agent 212a, 212b is connected to all other data protection appliances in the cluster. In this example there are two DPAs in the cluster (e.g., a data protection appliance (DPA) 202a and a data protection appliance (DPA) 202b). Each DPA 202a, 202b is coupled to the WAN 128 and through the WAN 128 to the target site (Site II).

Each of the storage arrays 206a, 206b includes a consistency group (CG) (e.g., the storage array 206a includes a CG 226a and the storage array 206b includes a CG 226b). Each storage array may have multiple CGs and there might be CGs containing volumes from multiple storage array. Each CG in this case may run on one DPA only, and a mega CG is a virtual CG or a group set which gives consistency between multiple consistency groups.

The CG 226a includes Volume X 216a, Volume Y 216b and Volume Z 216c on a storage array 206a. The CG 226b includes Volume J 216d, Volume K 216e and Volume Z 216f on a storage array 206b.

Two or more CGs can form a mega consistency group or a group set. For example, CGs 226a, 226b form a mega consistency group 250. While each CG may be replicated by a single DPA, a mega CG may be replicated in a consistent way on multiple DPAs.

The storage array 206b also includes an additional volume, for example, a volume Q 266 which is not part of the CG 226b and therefore not part of the mega consistency group 250.

Though not shown herein one of ordinary skill in the art would recognize that the Target Side (Site II) would include corresponding components including DPAs and CGs as the source side (Site I).

In operation, hosts 104, 105, 106 write to the storage arrays 206a, 206b. In particular, the hosts 105, 106 write to storage array 206a and the host 104 writes to the storage array 206b.

The data protection agents 212a, 212b intercepts an I/O sent to their respective storage arrays 206a, 206b and sends the I/O to the DPA 202a, 202b which is replicating the CG which contains the volume for which the I/O was sent. The DPAs 202a, 202b send their respective I/O over to their respective target side DPA (not shown) to be replicated. After the target side DPAs acknowledge receipt of the I/O (e.g., after storing the I/O at a target side storage array) back to the source side DPAs 202a, 202b, the I/O is sent down the I/O stack of the storage array.

In another example, an I/O may be sent to a target side and down the production storage I/O stack at the same time.

Once acknowledgment that the IO has arrived to both source and target storage arrays, the storage array 206a, 206b returns a status message back to the host 104.

Figure 3:
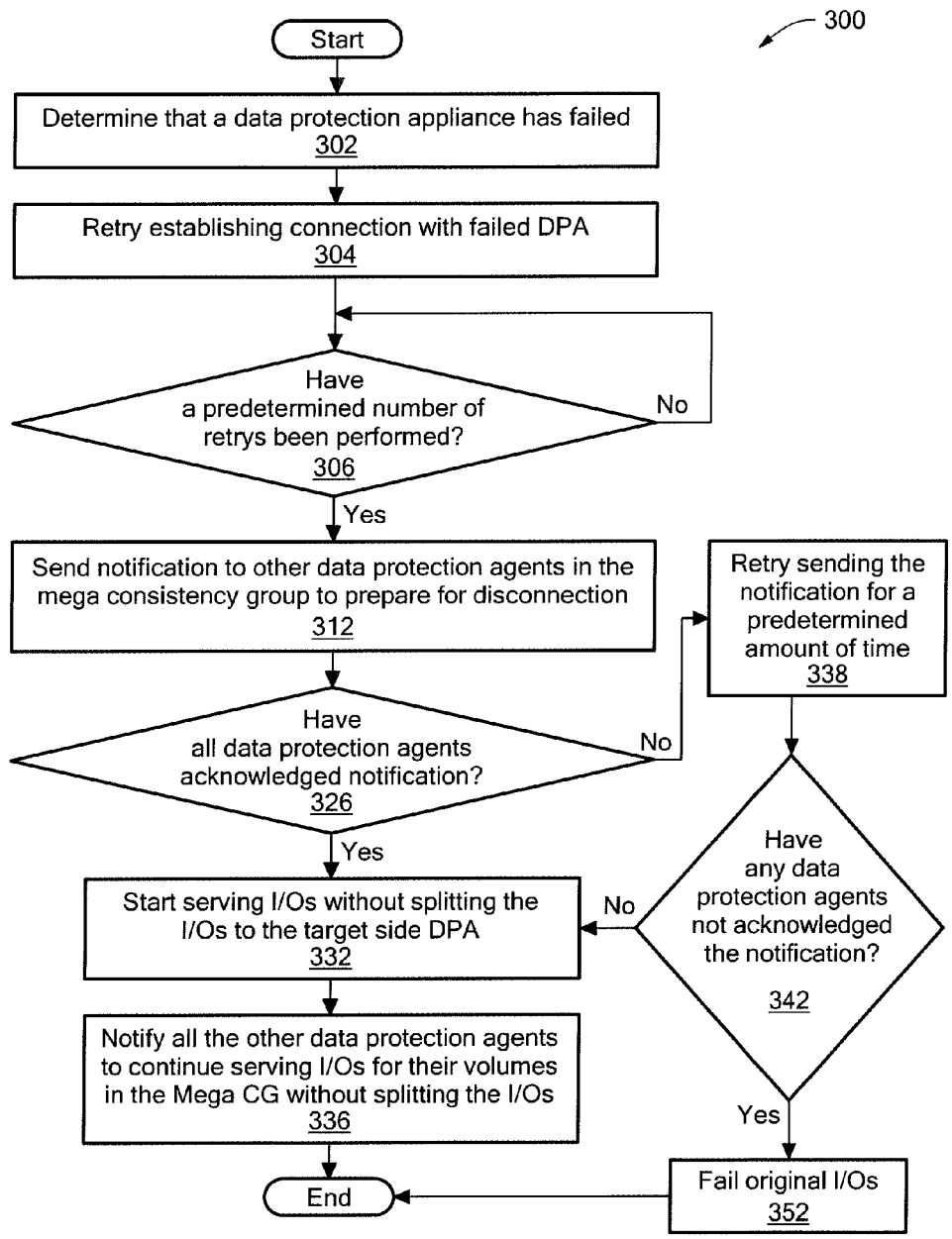
FIG. 3 is a flowchart of an example of a process performed by a data protection agent that detects a failure with its data protection appliance.

Referring to FIG. 3, an example of a process performed by a data protection agent that detects a failure with a data protection appliance. Process 300 is one example to provide consistency in synchronous replication across multiple data protection appliances and storage arrays Process 300 determines that a DPA has failed (302). For example, the data protection agent 212a determines that the DPA 202a has failed and that there is no way to recover the connectivity. Process 300 would like to resume serving production I/Os to the volumes replicated by the target side DPA, without replicating the I/Os to the target side (replication) site.

Process 300 retrys establishing connection with the failed DPA (304). Process determines if a predetermined number of retrys have been formed in establishing a connection with failed DPA (306).

If the predetermined number of retrys have been performed, process 300 sends a notification to the other data protection agents which replicate a volume in the same mega consistency group that the data protection agent of the failed DPA will be disconnected (312). The notification alerts the other data protection agents in the mega consistency group to prepare to stop splitting I/Os for replication and just serve I/Os directly to the source side storage array. For example, the communication channel between the data protection agents may be through the DPAs since each data protection agent has connectivity with all the DPAs in the cluster. In one particular example, if the DPA 202a has failed, the data protection agent 212b will be notified by the data protection agent 212a through the DPA 202b that the data protection agent 212a will be disconnected for volumes in the mega consistency group 250 (other volumes may continue to work correctly. In this example, there is synchronous replication amongst the volumes 216a-216f in the mega CG 250. In other examples, the data protection agents may have direct connectivity between them.

Process 300 determines if all the data protection agents in the mega consistency have acknowledged the notification (326). If all the data protection agents acknowledged, the data protection agent starts serving I/Os without splitting the I/Os to the target side DPA (332) and the data protection agent notifies all the other data protection agents to continue serving I/Os for their volumes in the mega CG without splitting the I/Os to the target DPA for replication (336).

If not all of the data protection agents have acknowledged the notification, process 300 retries sending the notification for a predetermined amount of time (338). If not all the other data protection agents acknowledge the notification (342), process 300 fails the I/Os (352).

Figure 4:
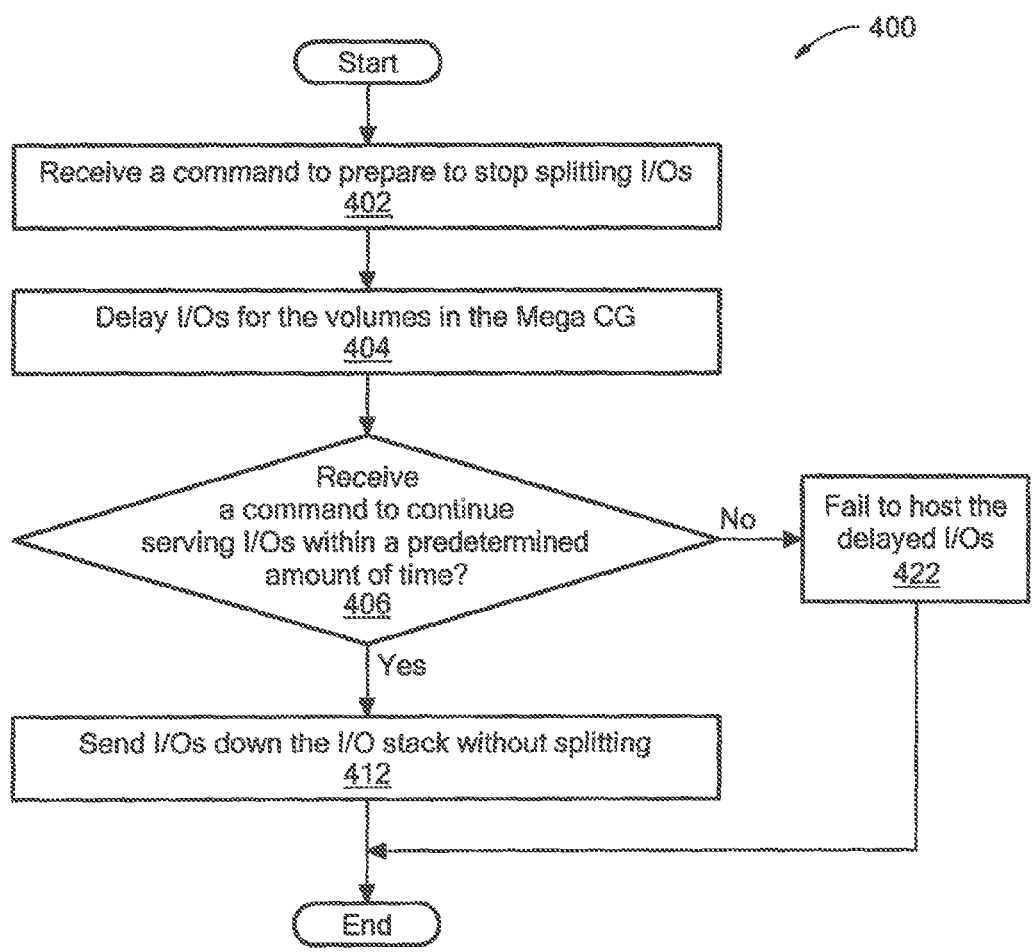
FIG. 4 is a flowchart of an example of a process performed by a data protection agent after it receives a command to prepare to stop splitting I/Os.

Referring to FIG. 4, an example of a process performed by a data protection agent after it receives a command to prepare to stop splitting the I/Os is a process 400. Process 400 receives a command to prepare to stop splitting I/Os (402). For example, the data protection agent 212b receives a command to stop splitting I/Os from the data protection agent 212a because both are part of the same mega consistency group 250.

Process 400 delays I/Os for the volumes in the mega consistency group (404). For example, the data protection agent 212b delays I/Os for the Volume J 216d, the Volume K 216e and the Volume L 216f and not send the I/Os to the DPA 202b to be sent through the WAN 128 and does not acknowledge receiving the I/Os. However, since Volume Q 266 is not part of the mega consistency group 250, the data protection agent 212b will continue to send I/Os to the Volume Q 266, send to the DPA 202b and acknowledges receiving the I/Os.

Process 400 determines if a command to continue serving I/Os is received within a predetermined time (406). For example, the predetermined time is 10 seconds.

If the command to continue serving I/Os is received within the predetermined time, process 400 sends the I/Os down the I/O stack without splitting the I/Os (412). If the command to serve I/Os directly to the I/O stack is not received within the predetermined amount of time, process 400 will fail to the host 104 the I/Os which were delayed by returning (422).

One of ordinary skill in the art would appreciate that the techniques described herein are a few of many possible processes to allow synchronous replication running on multiple storage arrays using multiple data protection appliances.

Figure 5:
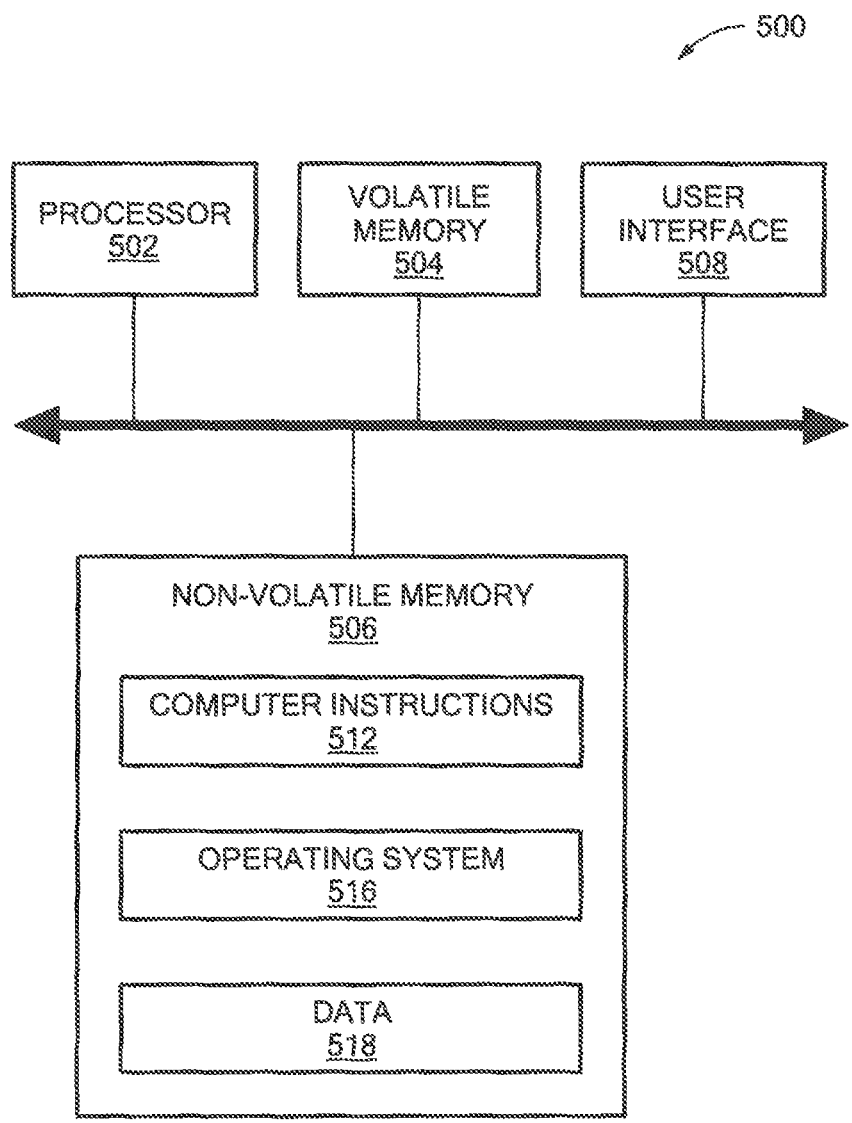
FIG. 5 is a computer on which any of the processes of FIGS. 3 and 4 may be implemented.

Referring to FIG. 5, a computer 500 includes a processor 502, a volatile memory 504, a non-volatile memory 506 (e.g., hard disk) and a user interface (UI) 508 (e.g., a mouse, a keyboard, a display, touch screen and so forth). The non-volatile memory 506 stores computer instructions 512, an operating system 516 and data 518. In one example, the computer instructions 512 are executed by the processor 502 out of volatile memory 304 to perform all or part of the processes described herein (e.g., processes 300 and 400).

The processes described herein (e.g., processes 300 and 400) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 300 and 400 are not limited to the specific processing order of FIGS. 3 and 4 respectively. Rather, any of the processing blocks of FIGS. 3 and 4 may be re-ordered, combined or removed, performed in parallel or in serial, as necessary, to achieve the results set forth above.

The processing blocks (for example, in the processes 300 and 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method comprising:
replicating multiple volumes synchronously across storage arrays using data protection agents;
determining that a component has failed comprising determining that a data protection appliance has failed;
trying to recover replication using another component;
if recovery of replication is not possible for a predetermined amount of time, stopping replication for all replicated volumes at a consistent point;
sending a notification to other data protection agents in the same mega consistency group that the data protection agent will be disconnected;
determining if the other data protection agents in the mega consistency group have acknowledged the notification;
serving I/Os without splitting the I/Os to a target side data protection appliance if the data protection agents acknowledged; and
notifying the other data protection agents to continue serving I/Os for their volumes in the mega consistency group without splitting the I/Os to the target side data protection appliance for replication if all the other data protection agents acknowledged.

2. The method of claim 1, further comprising using the data protection agents to replicate I/Os by splitting I/Os to a data protection appliance.

3. The method of claim 1, further comprising, if not all of the data protection agents have acknowledged the notification:
retrying sending the notification for a predetermined amount of time; and
failing the I/Os if not all the other data protection agents have acknowledged the notification.

4. The method of claim 1, further comprising delaying I/Os to volumes in the mega consistency group after receiving a command to prepare to stop splitting I/Os.

5. The method of claim 4, further comprising failing to the host I/Os that are delayed if a command to continue serving I/Os is not received within a predetermined amount of time.

6. The method of claim 4, further comprising sending I/Os down an I/O stack without splitting if a command to continue serving I/Os is received within a predetermined amount of time.

7. An article comprising:
a non-transitory machine-readable medium that stores executable instructions, the instructions causing a machine to:
replicate multiple volumes synchronously across storage arrays using data protection agents;
determine that a component has failed comprising instructions causing the machine to determine that a data protection appliance has failed;
try to recover replication using another component; and
if recovery of replication is not possible for a predetermined amount of time, stop replication for all replicated volumes at a consistent point;
send a notification to other data protection agents in the same mega consistency group that the data protection agent will be disconnected;
determine if the other data protection agents in the mega consistency group have acknowledged the notification;
serve I/Os without splitting the I/Os to a target side data protection appliance if the other data protection agents acknowledged; and
notify the other data protection agents to continue serving I/Os for their volumes in the mega consistency group without splitting the I/Os to the target side data protection appliance for replication if the other data protection agents acknowledged.

8. The article of claim 7, further comprising instructions causing the machine to use the data protection agents to replicate I/Os by splitting I/Os to a data protection appliance.

9. The article of claim 7, further comprising, instructions causing the machine to, if not all of the data protection agents have acknowledged the notification:
retry sending the notification for a predetermined amount of time; and
fail the I/Os if not all the other data protection agents have acknowledged the notification.

10. The article of claim 7, further comprising instructions causing the machine to delay I/Os to volumes in the mega consistency group after receiving a command to prepare to stop splitting I/Os.

11. The article of claim 10, further comprising instructions causing the machine to fail to the host I/Os that are delayed if a command to continue serving I/Os is not received within a predetermined amount of time.

12. The article of claim 10, further comprising instructions causing the machine to send I/Os down an I/O stack without splitting if a command to continue serving I/Os is received within a predetermined amount of time.

13. An apparatus, comprising:
circuitry configured to:
replicate multiple volumes synchronously across storage arrays using data protection agents;
determine that a component has failed comprising circuitry configured to determine that a data protection appliance has failed;
try to recover replication using another component; and
if recovery of replication is not possible for a predetermined amount of time, stop replication for all replicated volumes at a consistent point;
send a notification to other data protection agents in the same mega consistency group that the data protection agent will be disconnected;
determine if the other data protection agents in the mega consistency group have acknowledged the notification;

serve I/Os without splitting the I/Os to a target side data protection appliance if the other data protection agents acknowledged; and notify the other data protection agents to continue serving I/Os for their volumes in the mega consistency group without splitting the I/Os to the target side data protection appliance for replication if the other data protection agents acknowledged.

14. The apparatus of claim 13 wherein the circuitry comprises at least one of a processor, a memory, programmable logic and logic gates.

15. The apparatus of claim 13 wherein the circuitry is further configured to use the data protection agents to replicate I/Os by splitting I/Os to a data protection appliance.

16. The apparatus of claim 13 wherein the circuitry is further configured to, if not all of the data protection agents have acknowledged the notification:

retry sending the notification for a predetermined amount of time; and fail the I/Os if not all the other data protection agents have acknowledged the notification.

17. The apparatus of claim 13, further comprising instructions circuitry configured to delay I/Os to volumes in the mega consistency group after receiving a command to prepare to stop splitting I/Os.

18. The apparatus of claim 17, further comprising instructions circuitry configured to fail to the host I/Os that are delayed if a command to continue serving I/Os is not received within a predetermined amount of time.

19. The apparatus of claim 17, further comprising instructions circuitry configured to send I/Os down an I/O stack without splitting if a command to continue serving I/Os is received within a predetermined amount of time.

* * * * *